United States Patent [19]
Childs et al.

[11] 4,419,324
[45] Dec. 6, 1983

[54] METHOD FOR CONTINUOUS FRICTION ACTUATED EXTRUSION

[75] Inventors: John B. Childs; Owen P. McKenna, both of London, England

[73] Assignee: BICC Public Limited Company, London, England

[21] Appl. No.: 316,681

[22] Filed: Oct. 30, 1981

[30] Foreign Application Priority Data

Nov. 17, 1980 [GB] United Kingdom ............... 8036834

[51] Int. Cl.³ .............................................. B22F 1/00
[52] U.S. Cl. ...................................... 419/67; 419/69
[58] Field of Search ................. 264/111; 419/66, 67, 419/69

[56] References Cited

U.S. PATENT DOCUMENTS

3,530,210  9/1970  Patton ................................ 264/111

FOREIGN PATENT DOCUMENTS

1370894 10/1974 United Kingdom.
2069389A 8/1981 United Kingdom.

Primary Examiner—James R. Hall
Attorney, Agent, or Firm—Buell, Blenko, Ziesenheim & Beck

[57] ABSTRACT

In a continuous friction-actuated extrusion process, such as the Conform process, particulate material is fed into the extrusion passageway at a rate low enough to the rate at which material is extruded from the die orifice to be determined by and substantially equal to the rate of feeding. Feeding can be achieved by a simple hopper feeding through an adjustable constriction, preferably formed by a simple gate valve, or a gravimetric or volumetric controlled rate feed device can be used.

3 Claims, 4 Drawing Figures

METHOD FOR CONTINUOUS FRICTION ACTUATED EXTRUSION

This invention relates to the continuous friction-actuated extrusion of metals (and other materials) to produce wires, strips and other elongate bodies of considerable length.

By "friction-actuated" extrusion is meant a process comprising several steps the first consisting of feeding material into one end of a passage-way formed between first and second members with the second member having greater surface area for engaging the material than the first member, said passageway having an obstruction at the end remote from the end into which the material is fed and having at least one die orifice associated with the obstructed end. The next step is moving the passage-way defining surface of the second member relative to the passage-way defining surface of the first member in the direction towards the die orifice from the first end to the obstructed end such that frictional drag of the passage-way defining surface of the second member draws the material through the passage-way and generates in it a pressure that is effective to extrude it through the die orifice. The obstructed end of the passage-way may be blocked substantially entirely, as described in British Patent Specification No. 1,370,894 (United Kingdom Atomic Energy Authority). However in the most usual practice (the Conform process) the passage-way is arcuate and the second member is a wheel with a groove formed in its surface into which the first member projects and the obstructed end is defined by an abutment projecting from the first member, we prefer that the abutment member is of substantially smaller cross-section than the passage-way so that it leaves a substantial gap between the abutment member and the groove surface. In this way the material may adhere to the groove surface, as described in the specification of our British application publication No. 2,069,398A, whereby a proportion of the material extrudes through the clearance and remains as a lining in the groove to re-enter the passage-way at the entry end while the remainder of the material extrudes through the die orifice.

The Conform process was originally developed for the extrusion of a rod in-feed, and the dimensions of the passage-way were chosen to ensure that it would be filled by the material of the feed rod without any major axial compression of the rod. Subsequently, when particulate feed material came to be used in some cases, an excess of the feed material was invariably supplied by the use of a hopper, so that the passage way should be as full as possible of the particulate material, in order to minimise the volume of air spaces carried into the passage-way.

We have now discovered that this is not the ideal way of feeding particulate material to be extruded to a friction-actuated extrusion machine, and that more satisfactory results can be obtained by restricting the amount of material fed to such an extent that the output rate of the extrusion machine is controlled by the rate at which particles enter the passage-way.

In accordance with the invention, therefore, a friction-actuated extrusion process is distinguished by feeding the material into the passage-way in particulate form at a rate low enough for the rate at which material is extruded from the die orifice to be determined by and substantially equal to the rate of feeding (and in particular to be substantially independent of the speed of movement of the passage-way-defining surface of the second member, within the working range).

For optimum control, the rate of feeding may be regulated by a gravimetric or volumetric feed device operating without a buffer storage hopper downstream of it (such feed devices being commercially available); useful results can however be achieved for a lower cost by the use of a storage hopper feeding particulate material to the passage through a constriction of smaller cross-sectional area than the passage; such constriction is preferably adjustable to provide a single output speed control, and may be formed by a simple gate valve. The invention includes apparatus for friction-actuated extrusion incorporating feed rate control means of these or other kinds.

The process of the invention has the advantage that the quantity of unconsolidated material in the passage, and consequently the energy consumed in frictional drag between that unconsolidated material and the second member, may be reduced, which is an important consideration when extruding relatively hard materials, such as copper and its alloys, as this relieves the very high stresses liable to be generated in the members that define the passage-way; and it allows the conditions of operation to be optimised during running, to secure the maximum output consistent with acceptable torque, stress, temperature and other variables.

Furthermore, the output rate can be controlled, without loss of quality, down to very small values, something that cannot be done by slowing down the main members of the machine alone. This is especially valuable at the initial start-up of the machine, when a very low output speed allows continuous threading of the leading end of the product through cooling apparatus and onto a reel or other take-up device; it may also be useful during reel changeover allowing a simpler mechanism to be used.

The invention will be further by way of example with reference to the accompanying drawings in which.

Figure 1:
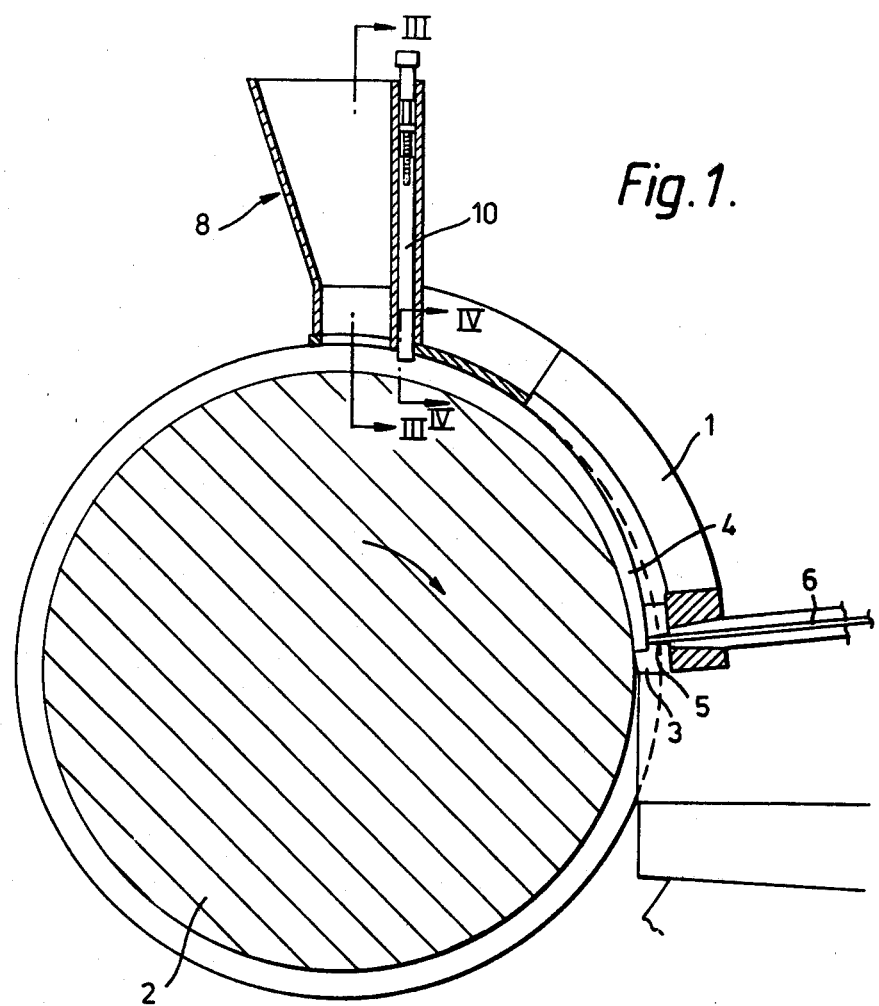
FIG. 1 is a diagrammatic cross-section of one form of apparatus in accordance with the invention.

In the apparatus shown in FIG. 1, the extrusion passage-way is formed between a first member in the form of a shoe 1 which is fixed and forms one side wall of the passage-way and a rotating wheel 2 which is grooved to form the other three side walls of the passage-way. The shoe 1 supports an abutment member 3 which projects into and defines the outlet end of the passage-way 4, and which provides an orifice 5 through which the extruded product 6 emerges. In accordance with the prior invention described in our British Patent Application Publication No. 2,069,398A, the abutment member 3 does not completely block the end of the passage-way, but leaves a substantial clearance through which a coating 7 (FIG. 4) is formed in the base of the wheel groove.

The apparatus shown is fitted with a hopper 8 in order to control the infeed of particulate material in accordance with the present invention.

Figure 4:
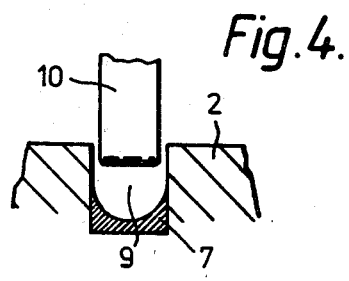
FIGS. 3 and 4 are enlarged cross-sections on the lines III—III and IV—IV respectively in FIG. 1.
Figure 2:
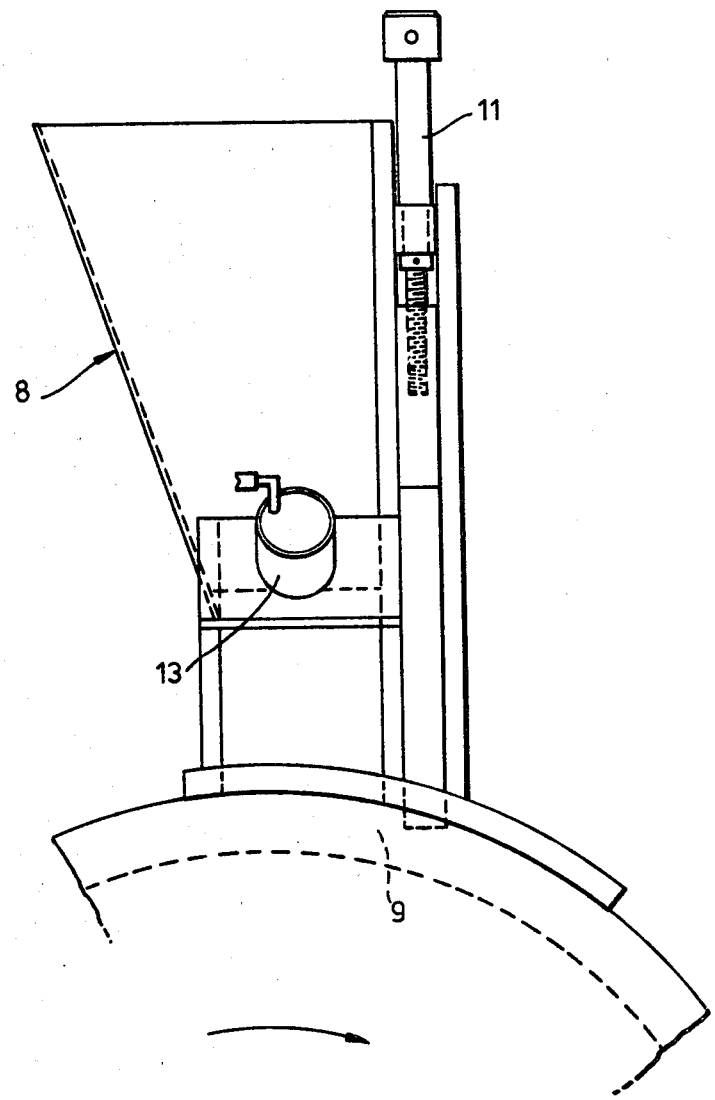
FIG. 2 is a side elevation of a characteristic portion of the apparatus.
Figure 3:
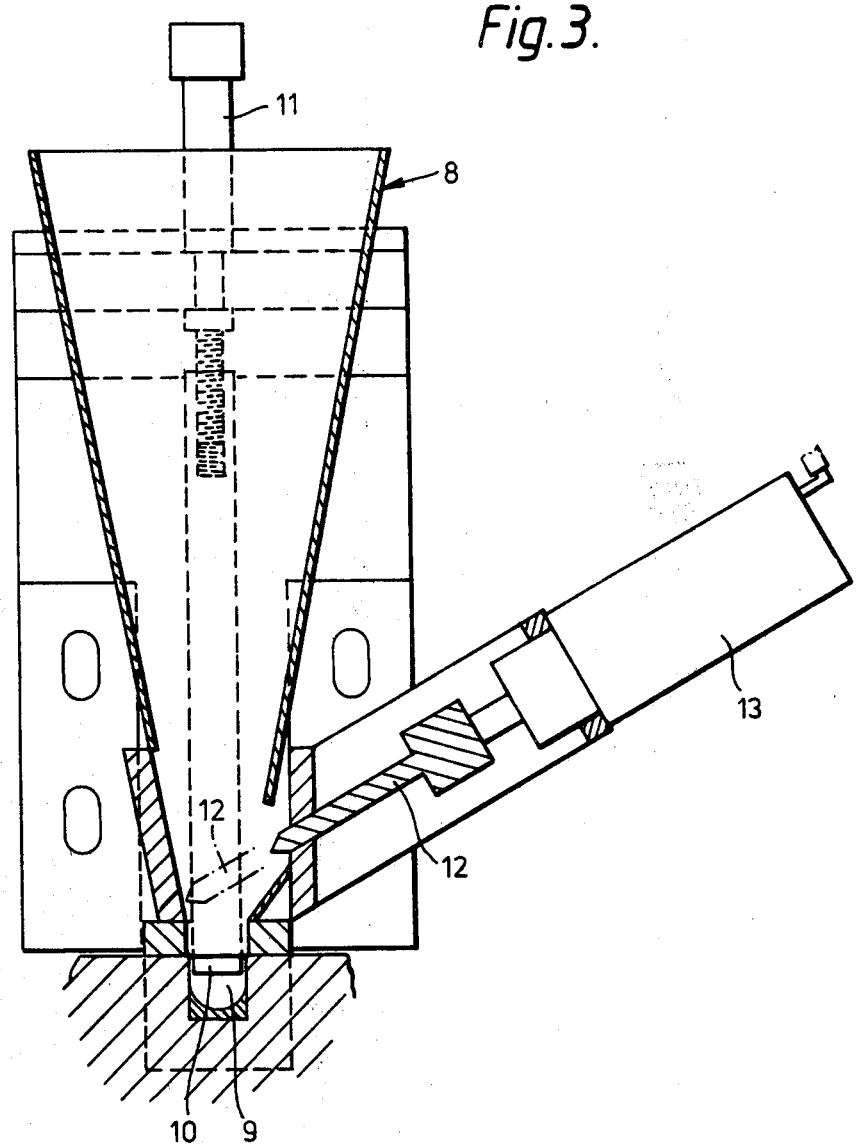

Referring now to FIGS. 2, 3 and 4, the hopper 8 is a simple, steep sided funnel of rectangular cross-section discharging directly into the wheel groove 9 at a point a little upstream of the entry end of the passageway 4. For controlling the rate of feed in accordance with the invention, a gate 10 is moveable by a screw mechanism 11 so as to extend to any required extent into the wheel groove and so restrict the flow of particles from the hopper into the extrusion passage-way 4.

Since the manual operation of the screw mechanism 11 will be relatively slow, a separate obturator member 12 is moveable by a pneumatic motor 13 into the position shown in broken lines in order to provide the facility for rapid complete shut-off when required, in an emergency or otherwise.

In the operation of this machine, the wheel 2 is first driven at about half its full running speed, and the gate 10 is set to constrict the passage-way only slightly. Particulate feedstock is then introduced by hand into the hopper at a low rate to obtain an initial extruded product sufficient for threading up to any suitable take-up mechanism. The obturator 12 is now closed while the hopper is filled (to a level afterwards held steady by a simple level detection system) with particulate material. Extrusion is then commenced in a controlled manner by opening the obturator 12 and increasing the wheel speed. As full running speed is approached, and when necessary thereafter, the gate 10 is adjusted to the widest opening consistent with ensuring that neither the torque required to maintain the wheel speed nor the pressure on the die assembly exceeds chosen maximum values. This adjustment can be made automatically by conventional means. If desired, for instance during reel changes in the take up, the output speed can be reduced to a required level by lowering the gate 10.

In a specific example, a "2 D" Conform friction-actuated extrusion machine, supplied by Babcock Wire Equipment Limited, was modified by fitting a semi-circular abutment as shown in FIGS. 3 to 5 of British Application No. 2,069,389A and the hopper shown in the drawings of this application. The die aperture was 2.5 mm and the full running speed of the wheel 20 revolutions per minute. The hopper was kept supplied with granulated cathode copper with a maximum particle size of about 3 mm. In normal running, the gate 10 was adjusted to a setting in the region of 3 mm projection into the wheel groove to limit the motor torque to 68.9 lb/ft$^2$ and the pressure on the die assembly to 56,580 lb/in$^2$; under steady conditions of running, an extrusion output of 689 ft/min was secured. The output speed, and the torque relative to that observed at full speed, for greater projection depths were measured as follows:

| Depth mm | Output m/min | Relative Torque |
| --- | --- | --- |
| 4 | 180 | 0.95 |
| 5 | 150 | 0.85 |
| 6 | 120 | 0.75 |

For greater projection depths, the situation is complicated by the fact that individual infeed particles may be unable to pass freely between the gate and the bottom of the groove—if it is desired to achieve very low output speeds without reducing the speed of the wheel, it is preferable to use more finely divided particles in the feed, or to use a gravimetric feed device instead of the gate valve.

What we claim as our invention is:

1. A method of continuous friction-actuated extrusion comprising the steps of feeding extrudible metal in particulate form into a first end of a passageway formed between first and second members with said second member having greater surface area for engaging said extrudible metal than the first member, said passageway having an obstruction at a second end remote from said first end and having at least one die orifice associated with the obstructed end, and continuously moving the passageway defining surface of said second member relative to the passageway defining surface of the first member in the direction towards the die orifice from said first end to said second end such that frictional drag of the passageway defining surface of the second member draws said extrudible metal through the passageway and generates in said extrudible metal a pressure that is effective to extrude said extrudible metal through the die orifice to form a body of uniform cross-section and indefinite length, wherein said extrudible material is fed into said passageway at a low rate such that the rate at which said body emerges from said die orifice is consequent upon and substantially equal to the rate of feeding, said passageway being of uniform cross-sectional area and said extrudible metal being fed thereto by a storage hopper feeding to said passageway through an adjustable constriction having a cross-sectional area smaller than the cross-sectional area of said passageway.

2. A method as claimed in claim 1 in which said low rate is set by a gravimetric feed device.

3. A method as claimed in claim 1 in which said low rate is set by a volumetric feed device.

* * * * *